Jan. 17, 1939.   W. H. MILLER   2,144,117
UNION ASSEMBLY
Filed Dec. 6, 1937

INVENTOR
WILLIAM H. MILLER
Toulmin & Toulmin
BY                ATTORNEYS

Patented Jan. 17, 1939

2,144,117

UNITED STATES PATENT OFFICE 2,144,117

UNION ASSEMBLY

William H. Miller, Royal Oak, Mich., assignor to The Flex-O-Tube Company, Detroit, Mich., a corporation of Delaware Application December 6, 1937, Serial No. 178,231

3 Claims. (Cl. 285—9)

This invention relates to union assemblies and in particular to assemblies adapted to provide connection between lengths of pipe, hose and the like, or between a length of hose or pipe and a screw-threaded connection such as a nipple, valve or other screw-threaded attachment.

It is an object of this invention to provide, in such a construction, the utmost simplicity and strength.

It is a further object of this invention to provide such a construction which is comprised of two parts secured together under pressure to form a two-part union assembly having therein a swivel joint which is leak-proof under high pressures, which permits of free relative rotary movement between the constituent parts and whereby the parts are so securely attached together as to be incapable of separation under high interior pressures.

It is a further object of this invention to provide a method of assembling the parts in such manner that upon assembly a portion of one part is made complementary to a portion of another part, whereby the portions interlock to form a swivel union between the parts.

These and other objects and advantages will appear from the following description taken in connection with the drawing.

Figure 2:
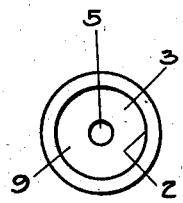
Figure 2 is an end view of the structure shown in Figure 1, as seen from the left.
Figure 1:
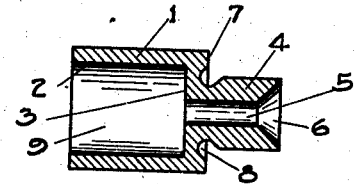
Figure 1 is a longitudinal section of one part of a union assembly constructed according to this invention before assembly.
Figure 3:
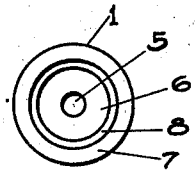
Figure 3 is a similar view of the structure of Figure 1, as seen from the right.

Referring to the drawing and with reference particularly to Figures 1, 2 and 3, the member 1 which is adapted for suitable attachment to a hose, pipe length or the like, comprises a cup-shaped body with an interior annular wall 2 and a circular end wall 3, from which projects axially outwardly the cylindrical extension 4 which is provided with a central axial bore 5 terminating outwardly in the conical surface 6.

At the juncture of the extension 4 and outer surface 7 of the wall 3, the member 1 is provided with an annular groove 8 of arcuate section. The cylindrical recess formed by the annular wall 2 and end wall 3 is designated 9 and is adapted to have the end of the hose, pipe or the like snugly fitted thereinto and secured therein by upsetting portions of the cup-shaped portion of the member 1 to clampingly engage the inserted hose or pipe, or by any other suitable means.

Figure 5:
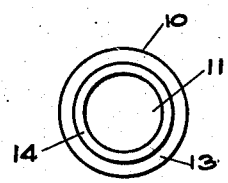
Figure 5 is an end view of the structure shown in Figure 4, as seen from the left.
Figure 4:
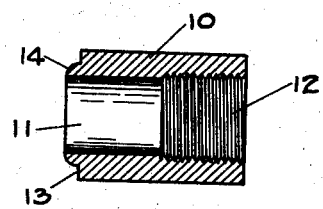
Figure 4 is a view similar to Figure 1, but showing the other part of the union assembly before its assembly to the parts shown in Figures 1, 2 and 3.
Figure 6:
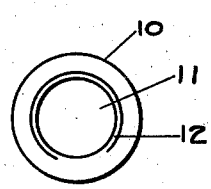
Figure 6 is a similar view of the structure shown in Figure 4, as seen from the right.

As shown in Figures 4, 5 and 6, the other member 10, which with the member 1 comprises the union, is substantially cylindrical and is provided with a central bore 11 extending therethrough from end to end, which bore is provided adjacent one end of the member 10 with screw threads 12 by means of which the member 10 may be screw-threadedly attached to any suitable nipple, valve stem or other screw-threaded connection having a seat to correspond with conical surface 6. At its opposite end, the member 10 is provided with an annular flat step 13, inwardly of which is formed a ring or annular portion 14 of arcuate section. The unthreaded portion of the bore 11 of the member 10 is adapted to closely engage the outer cylindrical surface of the cylindrical extension 4 for free rotation between the parts 1 and 10.

Figure 7:
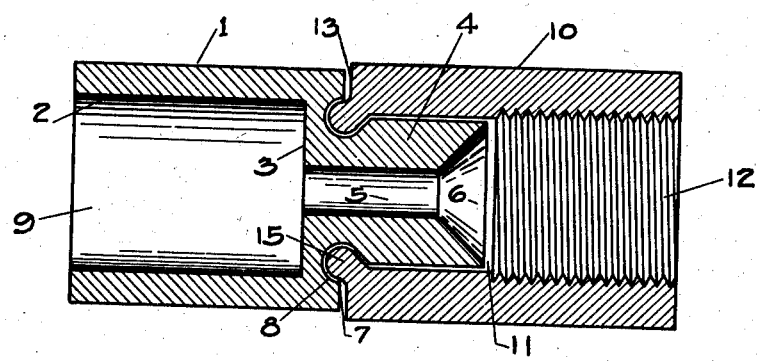
Figure 7 is a longitudinal section of the assembled union assembly.

As will be clearly understood, when the parts 1 and 10, in the form shown in Figures 1 to 6, are assembled, the parts 1 and 10 are freely separable, axially, from one another. However, in order to provide for free rotation therebetween while preventing relative axial movement therebetween when attached together to form the union of this invention, the members are assembled and pressure applied thereto by any suitable known means, in any suitable known manner, to force the edge portion 14 securely into the groove 8 and so distort the metal as to form from the portion 14 an annular retaining flange, ring or bearing member 15 of arcuate section snugly fitting the groove. The sections of the retaining flange 15 and groove 8 are complementary and, as the groove 8 forms, in effect, an undercut shoulder in the cylindrical extension 4, when the parts are assembled, as shown in Figure 7, appreciable relative axial movement therebetween is totally prevented while free relative rotation is permitted therebetween.

This free relative rotation permits of rotation of the member 10 for screw-threaded attachment thereof with a suitable nipple or the like without rotation of the member 1, whereby a hose, pipe or the like secured to the member 1 may be operatively attached to the screw-threaded nipple or the like without rotation of, or the transmission of rotary stress to, the pipe or hose connected to the member 1. While this construction is susceptible of use in various widely divergent relationships, it is particularly suitable for use on air and fluid brake conduits and the like.

It will be understood that the above-described structure is merely illustrative of the manner in which the principles of my invention may be utilized and that I desire to comprehend within my invention such modifications as come within the scope of the claims and the invention.

Having thus fully described my invention, what I claim as new and desire to secure by Letters Patent is:

1. A union assembly comprising a cup-like body adapted for connection to a hose and having an axial extension with a restricted axial bore and an annular external groove arcuate in cross section therein, and a second body having an internal bore snugly engaging the exterior of said extension and having integrally formed at one end thereof an annular retaining arcuate flange engaging and fitting said groove and cooperating therewith to secure said bodies together against axial displacement while providing for free relative rotation.

2. A union assembly comprising a body having at one end a cylindrical recess adapted for attachment to the end of a conduit, a cylindrical extension at the other end of said body having an undercut arcuate groove arcuate in cross section therein, a second body having a bore with a portion snugly engaging the exterior of the extension of said first body and having screw threads in another portion of said bore, and an integral flange on said second body arcuate in cross section and of less diameter than the bore of said body complementary to said groove and interengaging therewith to secure said bodies together for free rotation.

3. A union assembly comprising a cup-like body adapted for connection to a hose and having an axial extension with an annular undercut arcuate external groove therein, and a second body having an internal bore snugly engaging the exterior of said extension and having integrally formed at one end thereof an annular retaining arcuate flange, the parts being so constructed and arranged that the application of longitudinal pressure when the parts are in telescopic relation will cause the material of the flange to flow into said undercut groove between the coupling parts.

WILLIAM H. MILLER.